(12) United States Patent
Miyanagi et al.

(10) Patent No.: US 7,791,636 B2
(45) Date of Patent: Sep. 7, 2010

(54) SCANNING OPTICAL MODULE AND IMAGE FORMING APPARATUS EQUIPPED THEREWITH

(75) Inventors: Hideto Miyanagi, Osaka (JP); Yuuya Shimohora, Osaka (JP); Akihiro Masaki, Osaka (JP)

(73) Assignee: Kyocera Mita Corporation (JP)

( * ) Notice: Subject to any disclaimer, the term of this patent is extended or adjusted under 35 U.S.C. 154(b) by 0 days.

(21) Appl. No.: 12/106,556

(22) Filed: Apr. 21, 2008

(65) Prior Publication Data
US 2008/0267664 A1 Oct. 30, 2008

(30) Foreign Application Priority Data
Apr. 24, 2007 (JP) ............................. 2007-113900
Apr. 24, 2007 (JP) ............................. 2007-113901

(51) Int. Cl.
*B41J 27/00* (2006.01)
(52) U.S. Cl. .................................................... 347/261
(58) Field of Classification Search ......... 347/241–243, 347/256–261, 231; 399/92
See application file for complete search history.

(56) References Cited
U.S. PATENT DOCUMENTS
5,985,697 A * 11/1999 Chaney et al. .............. 438/122

| | | | |
|---|---|---|---|
| 6,356,722 B1 * | 3/2002 | Kida | 399/92 |
| 6,825,872 B2 * | 11/2004 | Chikano | 347/263 |
| 7,149,453 B2 * | 12/2006 | Fujita | 399/92 |
| 7,495,912 B2 * | 2/2009 | Long et al. | 361/697 |
| 2006/0185871 A1 * | 8/2006 | Kojima | 174/17 VA |
| 2008/0025750 A1 * | 1/2008 | Yamazaki et al. | 399/92 |

FOREIGN PATENT DOCUMENTS

| | | |
|---|---|---|
| JP | 6-15870 | 3/1994 |
| JP | 2000-206627 | 7/2000 |
| JP | 2002251113 A * | 9/2002 |
| JP | 2006010814 A * | 1/2006 |

\* cited by examiner

*Primary Examiner*—Hai C Pham
(74) *Attorney, Agent, or Firm*—Gerald E. Hespos; Michael J. Porco

(57) ABSTRACT

Disclosed is a scanning optical module, which includes a light source, a rotatable multifaceted mirror adapted to scanningly deflect a scanning beam emitted from the light source, in a given direction, a driving device adapted to drivingly rotate the rotatable multifaceted mirror through a shaft thereof, a plate-shaped member formed with a driving device-mounting portion mounting thereto the driving device in such a manner as to absorb heat generated in the shaft, an air blower adapted to generate an airstream, and an airstream passage-defining member adapted to direct the airstream from the air blower, toward the driving device-mounting portion of the plate-shaped member.

15 Claims, 8 Drawing Sheets

SCANNING OPTICAL MODULE AND IMAGE FORMING APPARATUS EQUIPPED THEREWITH

BACKGROUND OF THE INVENTION

1. Field of the Invention

The present invention relates to a scanning optical module designed to emit a scanning beam onto a surface of an image bearing member, and an image forming apparatus equipped with the scanning optical module.

2. Description of the Related Art

An electrophotographic process is employed by most image forming apparatuses, and a scanning optical module for use therein is provided with a polygon mirror. A scanning beam from a light source is scanningly deflected in a given direction by the polygon mirror, and emitted onto an electrostatically pre-charged surface of an image bearing member such as a photosensitive drum, whereby an electrostatic latent image is formed on the surface of the photosensitive drum. Then, the electrostatic latent image is developed using toner to form a toner image. This toner image is transferred onto a sheet and then fixed thereon.

During the above operation, the polygon mirror is drivenly rotated according to rotation of a driving motor, and the rotation of the driving motor inevitably gives rise to heat generation in a motor shaft. As measures against this heat, there has been known a technique of absorbing the heat by a heat sink, and air-cooling the heat sink by a cooling fan (see, for example, JP 06-015870A and JP 2000-206627A).

Along with advances in performance of image forming apparatuses, there is an increasing need for drivenly rotating the polygon mirror at a higher speed. Under such a high-speed rotation, a significantly large amount of heat is generated in the motor shaft. In this case, an optimal cooling for the heat sink is achieved by allowing an airstream from the fan to be distributed all over the heat sink.

The above conventional technique is designed such that an airstream from the fan is simply supplied toward the heat sink. In this cooling approach, the airstream is liable to reach only a portion of the heat sink, resulting in failing to achieve the optimal cooling and causing a problem about deterioration in reliability of the scanning optical module. Specifically, in conjunction with heat generation in the motor shaft, a housing for the polygon mirror is expandingly deformed. The expansive deformation leads to image quality defects (e.g., a focus defect and a magnification defect due to displacement), because even a slight displacement of a scanning beam-emitting position relative to the photosensitive drum has a direct impact on image quality. As above, in terms of positively cooling the heat sink, there remains a problem in the conventional technique.

SUMMARY OF THE INVENTION

It is an object of the present invention to provide a scanning optical module capable of positively releasing (i.e., dissipating) heat absorbed in a heat sink to obtain enhanced reliability of the scanning optical module, and an image forming apparatus equipped with the scanning optical module.

In order to achieve the above object, according to one aspect of the present invention, there is provided a scanning optical module which comprises a light source, a rotatable multifaceted mirror adapted to scanningly deflect a scanning beam emitted from the light source, in a given direction, a driving device adapted to drivingly rotate the rotatable multifaceted mirror through a shaft thereof, a plate-shaped member formed with a driving device-mounting portion mounting thereto the driving device in such a manner as to absorb heat generated in the shaft, an air blower adapted to generate an airstream, and an airstream passage-defining member adapted to direct the airstream from the air blower, toward the driving device-mounting portion of the plate-shaped member.

According to another aspect of the present invention, there is provided a scanning optical module which comprises a light source, a rotatable multifaceted mirror adapted to scanningly deflect a scanning beam emitted from the light source, in a given direction, a motor adapted to drivingly rotate the rotatable multifaceted mirror through a motor shaft thereof, a heat sink which has a motor-mounting portion mounting thereto the motor on the side of a first surface thereof, and a plurality of fins projectingly provided on the side of a second surface thereof on an opposite side of the first surface, and an air blower adapted to generate an airstream. In the scanning optical module, a part or all of the fins define an airstream passage adapted to guide the airstream generated by the air blower, in a given direction. The airstream passage is configured to pass through the side of the second surface at a position corresponding to the motor-mounting portion or a vicinity thereof on the side of the first surface.

According to yet another aspect of the present invention, there is provided an image forming apparatus which comprises an image support member adapted to allow an electrostatic latent image to be formed on a surface thereof, and a scanning optical module adapted to emit a scanning beam onto the surface of the image support member so as to form an electrostatic latent image thereon. In the image forming apparatus, the scanning optical module has the aforementioned feature.

DETAILED DESCRIPTION OF THE PREFERRED EMBODIMENTS

Figure 1:
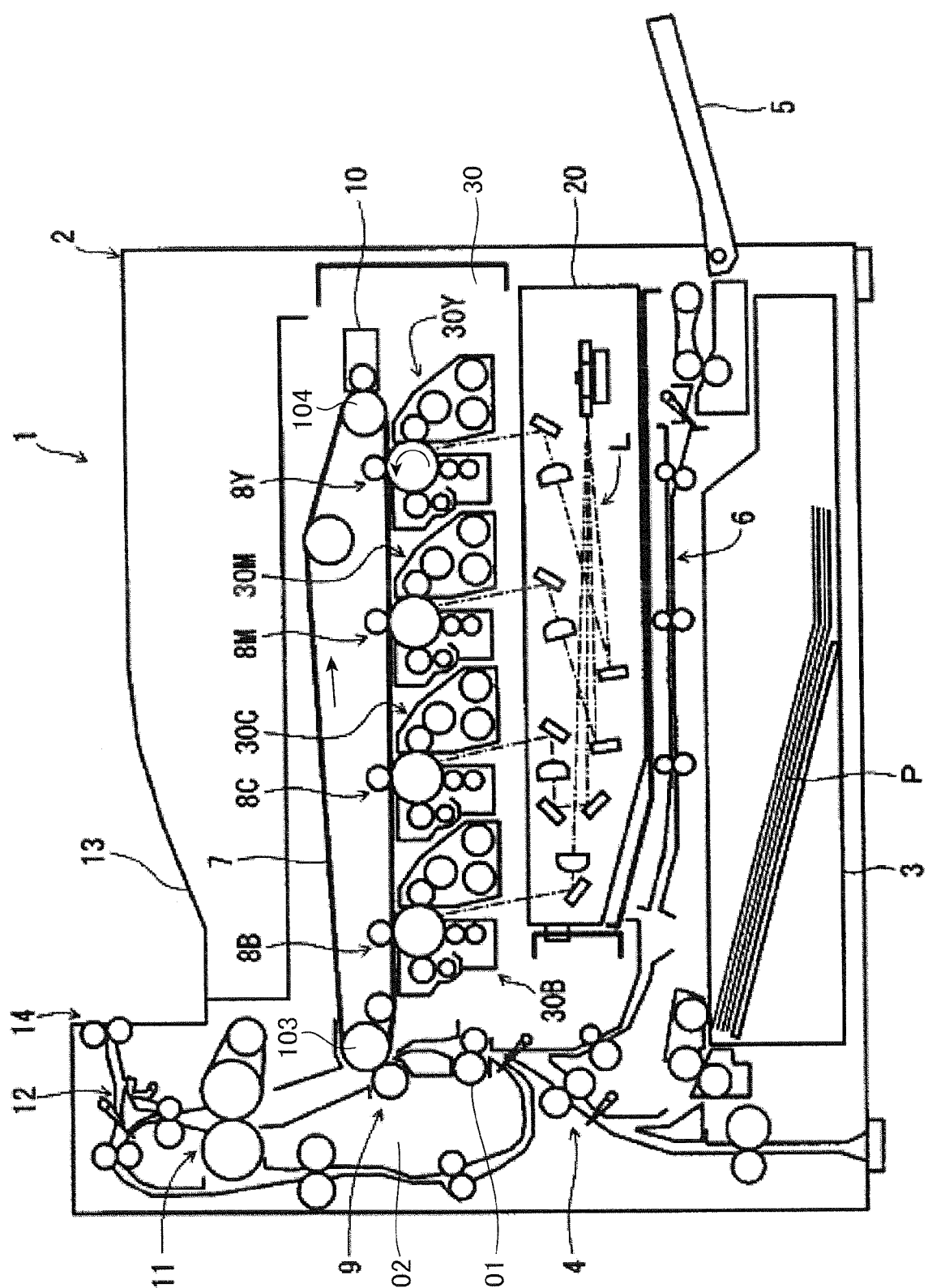
FIG. 1 is a schematic diagram of an image forming apparatus according to one embodiment of the present invention.

With reference to the drawings, the present invention will now be described based on an embodiment thereof. FIG. 1 is a schematic diagram of a tandem-type color printer (as one example of an image forming apparatus) according to one embodiment of the present invention, wherein a rightward direction corresponds to a front side of the printer 1, and a leftward direction corresponds to a rear side of the printer 1.

The printer 1 includes an apparatus main body 2 with a housing structure. The apparatus main body 2 houses a sheet cassette 3, an exposure unit 20 (serving as a scanning optical module), an image forming module 30 and other components.

The sheet cassette 3 is arranged in a lower region of the apparatus main body 2. A plurality of sheets P before being subjected to an image forming process are stored in the cassette 3 in a stacked manner. Each of the sheets P is separated from the stack from the cassette 3, and sent out in the leftward direction.

A first sheet transport section 4 is provided on a left side of the cassette 3. The sheet P sent out from the cassette 3 is transported in a vertically upward direction along a left lateral surface of the apparatus main body 2 by the first sheet transport section 4. Further, a manual sheet feed section 5 is provided on an upper side of the cassette 3. Various types of sheets, such as a sheet having a size other than that of the sheet stored in the cassette 3, a thick sheet, and a sheet to be manually fed on a one-by-one basis, can be placed on the sheet feed section 5. A second sheet transport section 6 is provided on a left side of the sheet feed section 5. The sheet (i.e., recording member) from the sheet feed section 5 is transported to the first sheet transport section 4 via the second sheet transport section 6, and then transported in the vertically upward direction along the left lateral surface of the apparatus main body 2.

The apparatus main body 2 houses a registration roller 101, the image forming module 30 and a secondary transfer section 9, in such a manner that they are disposed in this order on a downstream side when viewed in a sheet transport direction. The exposure unit 20 is disposed below the image forming module 30. The exposure unit 20 is adapted to emit a laser beam L therefrom toward a surface of a photosensitive drum (serving as an image bearing member) provided in the image forming module 30.

The apparatus main body 2 further houses a fixing section 11 and an ejection branch section 12, in such a manner that they are disposed in this order on a downstream side relative to the secondary transfer section 9 when viewed in the sheet transport direction. In a one-side printing operation, the sheet P or the recording member discharged from the fixing section 11 is ejected to a catch tray 13 via the branch section 12.

A double-side printing unit 102 is disposed between the branch section 12 and the first sheet transport section 4. The double-side printing unit 102 is adapted to re-send, toward the secondary transport section 9, the sheet P returned by a switchback section 14 after being discharged from the fixing section 11.

The image forming module 30 in this embodiment comprises four image forming units 30Y, 30M, 30C, 30B. The image forming units 30Y, 30M, 30C, 30B are provided correspondingly to respective images having four different colors consisting of yellow (Y), magenta (M), cyan (C) and black (B), and arranged in this order along a direction from the front surface to the rear surface of the printer 1. The image forming units 30Y, 30M, 30C, 30B are provided, respectively, with four primary transfer sections 8Y, 8M, 8C, 8B, in order to sequentially form yellow, magenta, cyan and black images on an intermediate transfer belt 7.

Figure 2:
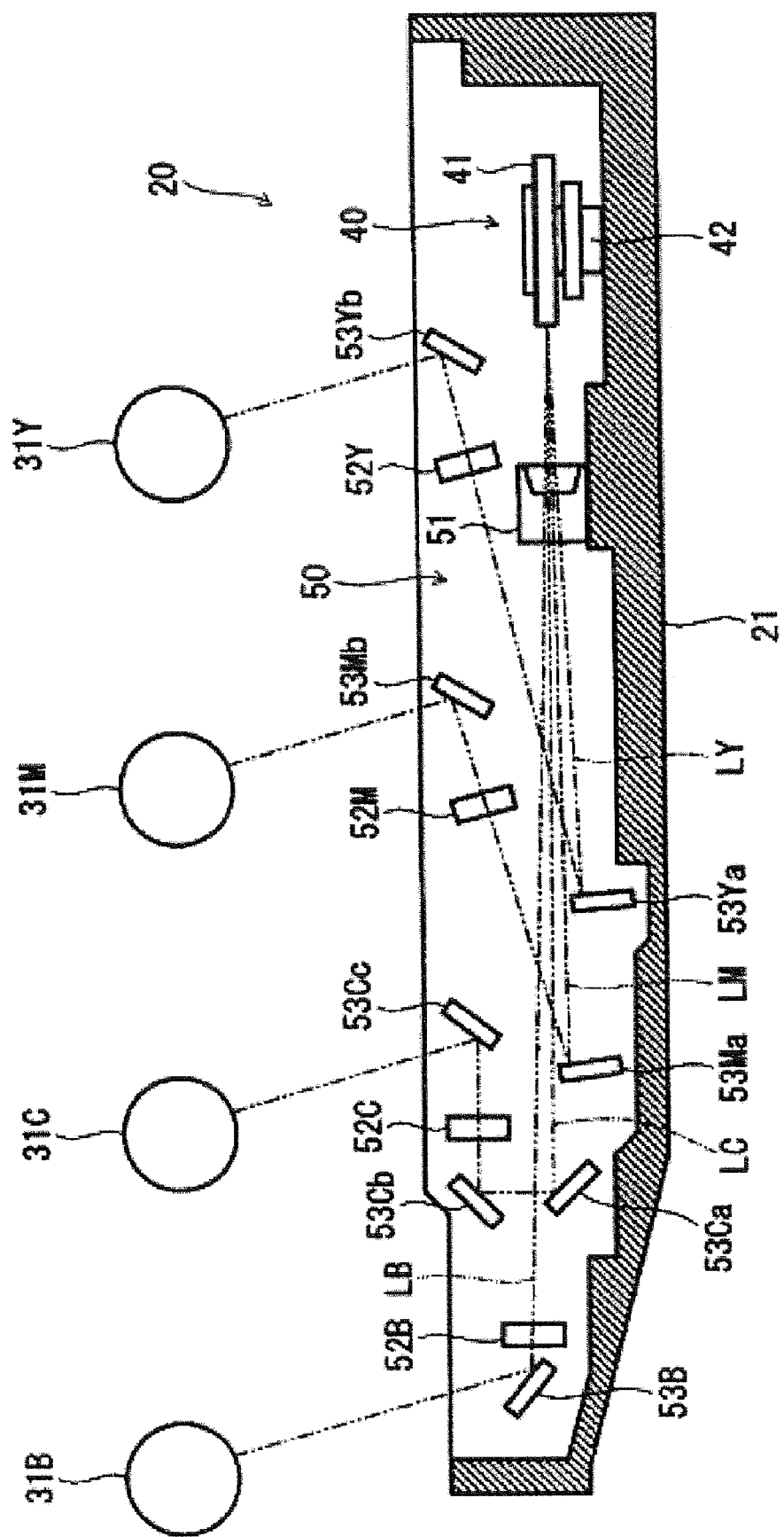
FIG. 2 is a sectional view of a scanning optical module illustrated in FIG. 1.

As also shown in FIG. 2, the image forming units 30Y, 30M, 30C, 30B are provided, respectively, with four photosensitive drums 31Y, 31M, 31C, 31B each adapted to bear a visible image (i.e., toner image) having a corresponding one of the colors. Each of the photosensitive drums is installed in a rotatable manner relative to the apparatus main body 2, and adapted to be driven in a counterclockwise direction (in FIG. 2) by a driving motor (not shown). Each of the image forming units further includes a charger unit adapted to electrostatically charge a surface of a corresponding one of the photosensitive drums in a uniform manner, a development unit adapted to supply toner onto the surface of the photosensitive drum, and a cleaner adapted to clean the surface of the photosensitive drum.

In the image forming units 30Y, 30M, 30C, 30B, each of the surfaces of the photosensitive drums 31Y, 31M, 31C, 31B is uniformly charged by the charger unit, and then a laser beam L based on image data is emitted from the exposure unit 20 onto the surface to form an electrostatic latent image thereon. Then, four colors of toners, i.e., yellow, magenta, cyan and black toners, supplied from the respective development units are electrostatically attached on the surfaces of the photosensitive drums, respectively. In this manner, a toner image based on the electrostatic latent image formed by the exposure unit 20 is developed on each of the surfaces of the photosensitive drums. The toner images formed on the respective photosensitive drums are transferred on the intermediate transfer belt 7 in a superimposed manner, in such a manner as to be combined together as a toner image for one page.

An endless-shaped belt prepared by superimposedly joining opposite ends of a sheet material made of a dielectric resin, or a seamless belt without a seam, may be used as the intermediate transfer belt 7. The intermediate transfer belt 7 is wound around between a driving roller 103 and a transport roller 104, in such a manner as to be circulatingly driven. The intermediate transfer belt 7 is associated with a cleaning unit 10 adapted to remove and collect residual toner on the intermediate transfer belt 7.

The secondary transfer section 9 is disposed adjacent to the driving roller 103. When the sheet P passes through between a roller of the secondary transfer section 9 and the intermediate transfer belt 7, the toner image transferred on the intermediate transfer belt 7 is secondarily transferred onto the sheet P. The sheet P subjected to the secondary transfer operation is transported toward the fixing section 11.

Figure 3:
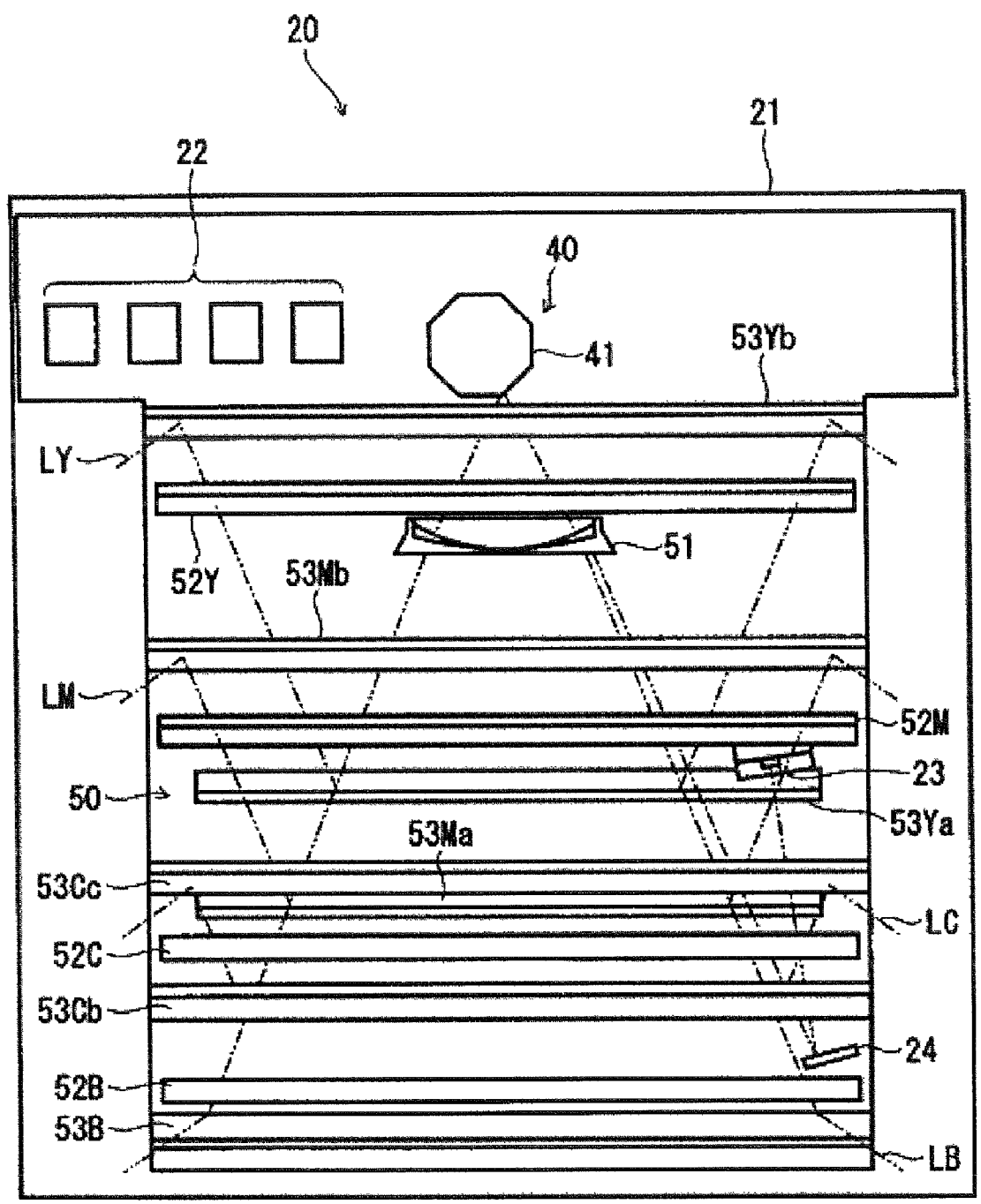
FIG. 3 is a top plan view of the scanning optical module.
Figure 4:
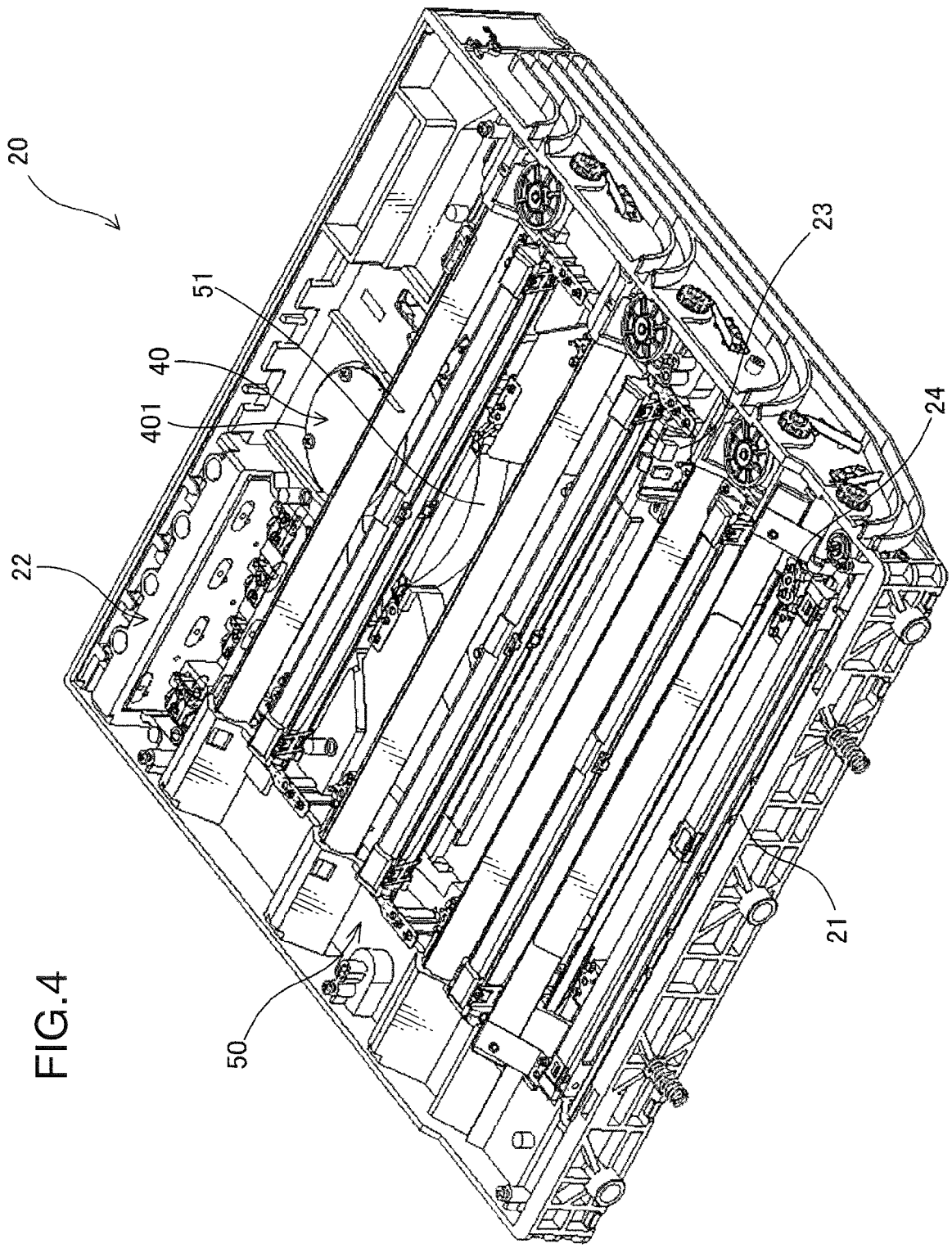
FIG. 4 is a perspective view of the scanning optical module.

The exposure unit 20 in this embodiment incorporates various optical devices. Specifically, as shown in FIGS. 2 to 4, the exposure unit 20 has a housing 21 having a generally rectangular shape in top plan view, and a cover member (not shown) covering the housing 21. The housing 21 houses various optical devices which include a light source 22, a light deflector 40, an optical system 50 and an optical sensor 23.

As shown in FIG. 3, the light source 22 is provided on the side of one end of the housing 21. The light source 22 comprises four independent light sources corresponding to the four colors, i.e., yellow, magenta, cyan and black. More specifically, as shown in FIG. 5, the light source 22 is provided with four laser diodes (LDs) 60 each adapted to emit a light beam in a visible region, such as a laser beam having a wavelength of about 670 nm.

The light deflector 40 is disposed on a lateral side of the light source 22. The light deflector 40 comprises a polygon mirror 41 (serving as a rotatable multifaceted mirror), and a driving motor 42 (serving as a driving device) (see FIG. 2). The polygon mirror 41 has a regular polygonal planar shape, wherein each lateral face is formed as a planar mirror (see FIG. 3). The polygon mirror 41 has a central portion fixedly attached to a shaft (i.e., motor shaft) 44 of the driving motor 42 (see FIG. 5). Thus, in conjunction with a high-speed rotation of the motor shaft 44 according to a driving force of the driving motor 42, the polygon mirror 41 is rotated at a high speed. The polygon mirror 41 is covered by an anti-noise cover 401 (see FIG. 4).

Figure 5:
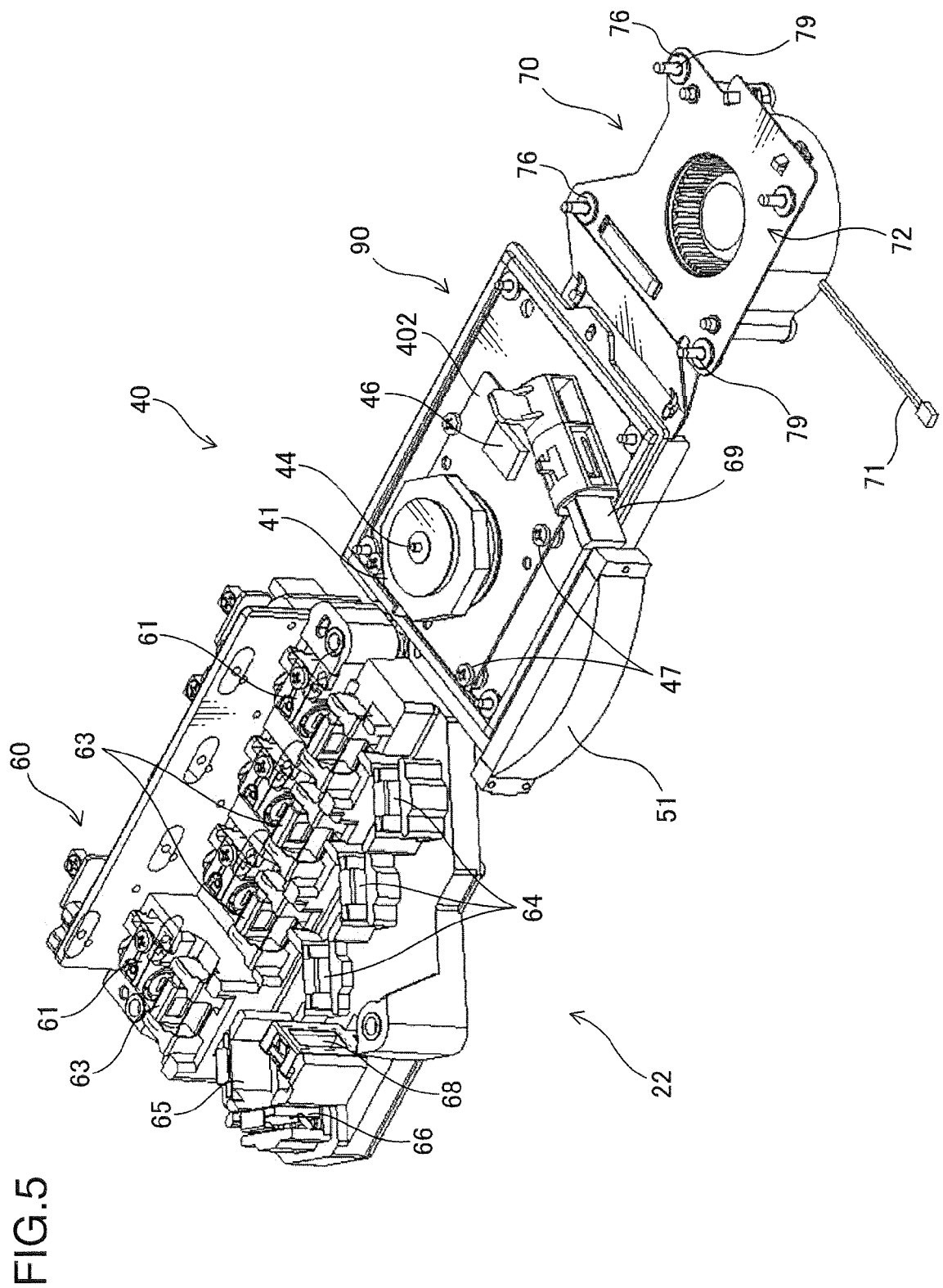
FIG. 5 is a perspective view of a principal part of the scanning optical module, when viewed downwardly from thereabove.

As shown in FIG. 5, each of laser beams LY, LM, LC, LB emitted from the four LDs 60 is reflected by reflecting mirrors 64, 65 after passing through a collimator lens 61 and a prism 63 which are disposed correspondingly to each of the LDs 60.

Then, the laser beam is reflected by a reflecting mirror 66, and, after passing through a cylindrical lens 68, reflected toward the polygon mirror 41 by a reflecting mirror 69 on the side of the light deflector 40.

Each of the laser beams LY, LM, LC, LB is incident on the polygon mirror 41 at an incidence angle deviated from a sub-scanning direction [in FIG. 2, an upward/downward (i.e., vertical) direction] by a small value. Then, the polygon mirror 41 being rotated reflects each of the laser beams to output the laser beam toward the other end of the housing 21 while deflecting the laser beam in a main-scanning direction [in FIG. 3, a rightward/leftward (i.e., lateral) direction].

The optical system 50 is provided in a traveling region of the laser beam reflected by the polygon mirror 41. The optical system 50 comprises a first f θ lens 51, a second f θ lens 52 (52Y, 52M, 52C, 52B), and a reflecting mirror 53 (53Ya, 53Yb, 53Ma, 53Mb, 53Ca, 53Cb, 53Cc, 53B). The first f θ lens 51 is disposed adjacent to the polygon mirror 41, and adapted to deflect each of the laser beams LY, LM, LC, LB reflected by the polygon mirror 41 to have a uniform velocity in the main-scanning direction.

Then, as shown in FIG. 2, the yellow laser beam LY after passing through the first f θ lens 51 is reflected by the reflecting mirror 53Ya disposed adjacent to a bottom surface of the housing 21 in such a manner as to be turned toward the first f θ lens 51. Subsequently, after passing through the second f θ lens 52Y, the yellow laser beam LY is reflected by the reflecting mirror 53Yb disposed adjacent to an upper end of the housing 21 to reach the surface of the yellow photosensitive drum 31Y.

The magenta laser beam LM after passing through the first f θ lens 51 is reflected by the reflecting mirror 53Ma disposed adjacent to the bottom surface of the housing 21 in such a manner as to be turned toward the first f θ lens 51, and, after passing through the second f θ lens 52M, reflected by the reflecting mirror 53Mb disposed adjacent to the upper end of the housing 21 to reach the surface of the magenta photosensitive drum 31M.

The cyan laser beam LC after passing through the first f θ lens 51 is reflected in an approximately vertically upward direction by the reflecting mirror 53Ca disposed adjacent to the bottom surface of the housing 21, and reflected in an approximately horizontal direction by the reflecting mirror 53Cb disposed adjacent to the upper end of the housing 21 to reach the surface of the magenta photosensitive drum 31M, in such a manner as to be turned toward the first f θ lens 51. Subsequently, after passing through the second f θ lens 52C, the cyan laser beam LC is reflected by the reflecting mirror 53Cc disposed adjacent to the upper end of the housing 21 to reach the surface of the cyan photosensitive drum 31C.

The black laser beam LB after passing through the first f θ lens 51 directly passes through the second f θ lens 52B disposed adjacent to the bottom surface of the housing 21, without going through any reflecting mirror. Subsequently, the black laser beam LB is reflected by the reflecting mirror 53B disposed adjacent to the second f θ lens 52B to reach the surface of the black photosensitive drum 31B.

The optical sensor 23 illustrated in FIG. 3 is a synchronization detection sensor (BD sensor) adapted to measure respective scanning timings of the laser beams LY, LM, LC, LB. The optical sensor 23 is disposed at an appropriate position adjacent to the reflecting mirror 53Ya and the second f θ lens 52M and on an outward side relative to the main-scanning direction. The optical sensor 23 is operable to receive each of the laser beams reflected by the polygon mirror 41 in a specific region out of an effective exposure region of each of the photosensitive drums. That is, the laser beam to be received by the optical sensor 23 is a laser beam reflected toward the first f θ lens 51 by a reflecting mirror 24 disposed adjacent to the second f θ lens 52B.

In this embodiment, various electric/electronic components, such as an integrated circuit 46 and a resistor, are mounted on a board 402 disposed around the light deflector 40 and on a rearward side of the reflecting mirror 69 within the housing 21. Further, a cooling fan 70 (serving as an air blower) is provided on a lateral side of the integrated circuit 46 to generate an airstream. The cooling fan 70 in this embodiment is a so-called "sirocco fan" adapted to receive a supply of electric power through an electric cord 71, and centrifugally send an airstream in a fan rotation direction, i.e., toward the mounting position of the integrated circuit 46 and the polygon mirror 41.

The cooling fan 70 is mounted to a fastening plate 72 (serving as a support member) which is attached to the housing 21. Specifically, as can be understood from FIG. 5 in combination with FIG. 6 which is a fragmentary perspective view of the exposure unit 20 when viewed upwardly from therebelow, the fastening plate 72 has a horizontal wall portion 73 fixed to a mount plate 26, a narrowing wall portion 74 extending from the horizontal wall portion 73 toward the mounting position of the polygon mirror 41, and a superimposing wall portion 75 extending further from the narrowing wall portion 74 toward the mounting position of the polygon mirror 41. The cooling fan 70 is fixed to the horizontal wall portion 73 by a screw, and four corners of the horizontal wall portion 73 are fixed to the mount plate 26 by screws.

The electric/electronic components, such as the integrated circuit 46, are operable, based on a signal from a controller (not shown), to drive the driving motor 42. The integrated circuit 46 and the components of the light deflector 40, such as the driving motor 42, are mounted on the side of a top surface (i.e., first surface) of a metal heat sink 90 (serving as a plate-shaped member).

Specifically, the heat sink 90 in this embodiment has a flat plate-shaped heat-sink body 91 having a generally rectangular shape in top plan view. This heat-sink body 91 is assembled to the housing 21 in such a manner that a flat surface thereof extends in a horizontal direction of the exposure unit 20. The light deflector 40 and the integrated circuit 46 are mounted to upper surface of the heat-sink body 91 (i.e., the first surface of the plate-shaped member) through a plate which is fixed to the heat-sink body 91 through four screws 47.

The heat sink 90 has a motor surrounding portion 93 (serving as a mounting portion) formed as a depression on the side of the top surface thereof to surroundingly receive therein a portion of the driving motor 42. On the side of a back surface of the heat sink 90 (serving as a second surface of the plate-shaped member), the motor surrounding portion 93 appears as a protrusion which protrudes in a downward direction of the housing 21 (in FIG. 6, the protrusion is represented as a columnar-shaped protrusion which protrudes upwardly).

Further, five fins 92 (serving as an airstream passage-defining member) are projectingly provided on the back surface of the heat sink 90, i.e., the lower surface of the heat-sink body 91 to extend in the downward direction of the housing 21. An upper surface of the second sheet transport section 6 is located immediately below the fins 92 in opposed relation thereto.

The fins 92 have a function of directing an airstream from the cooling fan 70. The fins 92 comprise five guide fins 95 (serving as a guide portion or a first fin portion), five deflection fins 96 (serving as a catch portion or a second fin portion), and five discharge fins 97. These fins 95, 96, 97 fundamentally serve as a radiation fin, and additionally serve as a means to define an airstream passage for allowing cooling air from the cooling fan 70 to pass therethrough.

The guide fins 95 have a function of guiding an airstream from the cooling fan 70 to a region corresponding to a position of the motor shaft 44. Specifically, the guide fins 95 are adapted to guide the airstream toward a position (of the motor surrounding portion 93) on the side of the lower surface of the heat-sink body 91 of the heat sink 90 which corresponds to a specific position of the upper surface of the heat-sink body 91 where the driving motor 42 is mounted, and a vicinity of the specific position. The guide fins 95 define four passages (i.e., airstream passages) therebetween to linearly guide the airstream from the cooling fan 70, to a position on a slightly upstream side relative to the position of the motor surrounding portion 93.

The guide fins 95 are formed such that they have approximately the same height, and one of them located closer to an adjacent outer wall 21a of the housing 21 has a shorter length. Further, each of the guide fins 95 has an upstream end extending to a vicinity of an edge of the heat sink 90 located in opposed relation to the cooling fan 70. A middle one 95a of the five guide fins 95 is projectingly provided at a position corresponding to the mounting position of the integrated circuit 46, whereby heat generated in the integrated circuit 46 is efficiently absorbed by the heat sink 90.

The deflection fins 96 are continuous with the respective guide fins 95 to serve as a means to deflect airstreams from the guide fins 95. Specifically, each of the deflection fins 96 is projectingly provided at a given angle (e.g., in FIG. 6, about 45 degrees) with a corresponding one of the guide fins 95, whereby the airstream passing through each of the four airstream passages is deflected due to collision with a standing surface of the deflection fin 96. The deflection fins 96 are formed such that they have approximately the same height, and one of them located closer to the adjacent outer wall 21a of the housing 21 has a shorter length.

Figure 6:
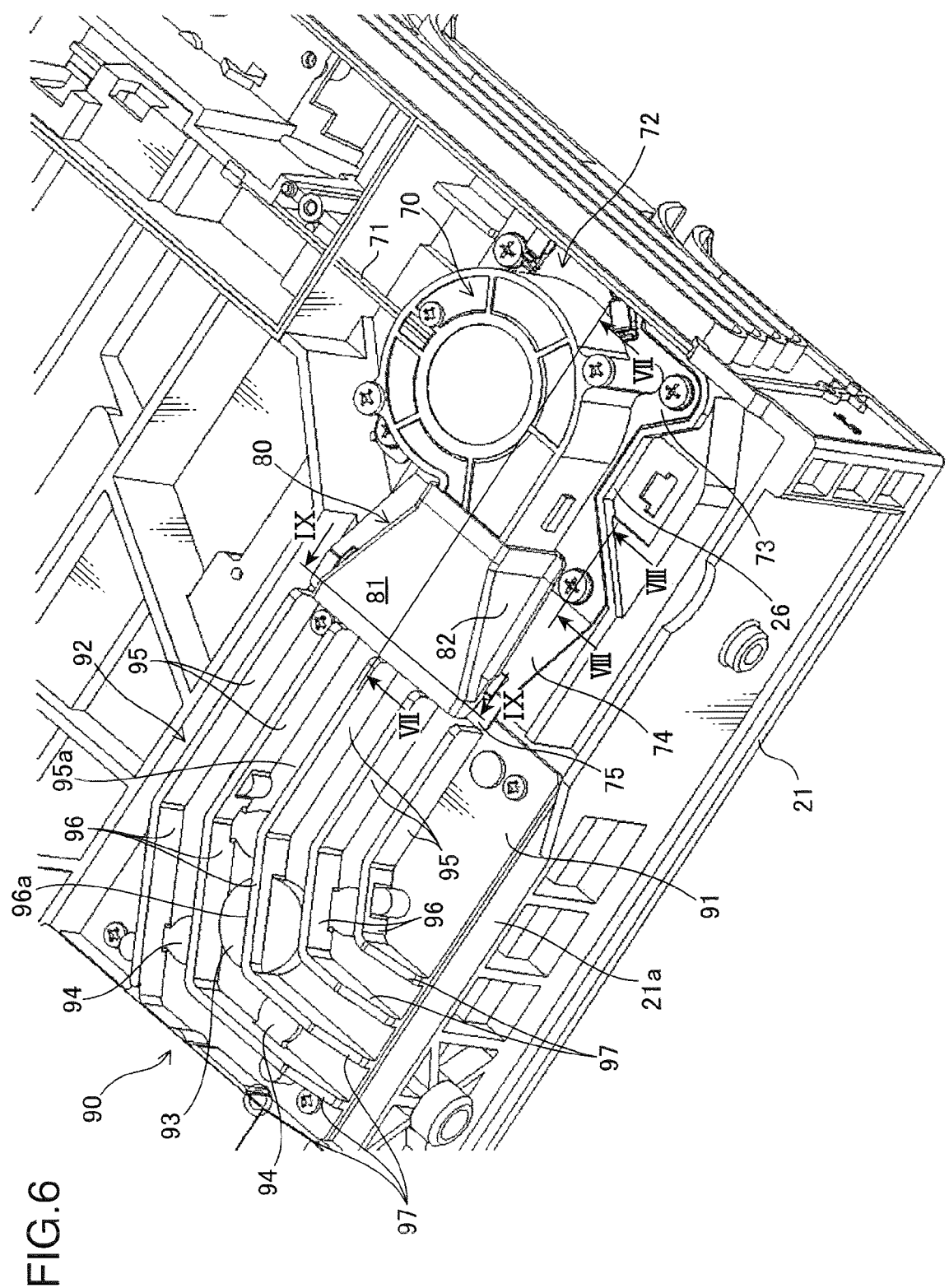
FIG. 6 is a fragmentary perspective view of the scanning optical module, when viewed upwardly from therebelow.

A middle one 96a of the five deflection fins 96 is projectingly provided in such a manner as to be in contact with the motor surrounding portion 93. More specifically, the middle deflection fin 96a is projectingly provided in such a manner as to extend along a diametral direction of the motor surrounding portion 93, i.e., pass through a center of a circular end surface of the columnar-shaped protrusion of the motor surrounding portion 93. Further, each of the two deflection fins 96 located on respective opposite sides of the middle deflection fin 96a is projectingly provided in such a manner that a standing surface thereof is brought into contact with an outer peripheral surface of the columnar-shaped protrusion of the motor surrounding portion 93. Thus, heat generated along with rotation of the motor shaft 44 is absorbed by the heat sink 90, mainly by the middle deflection fin 96a disposed immediately below the motor shaft 44. In FIG. 6, the reference numeral 94 indicates a screw surrounding portion surrounding an end of each of the screws 47.

The discharge fins 97 are continuous with the respective deflection fins 96 to serve as a means to discharge airstreams from the guide and deflection fins 95, 96, outside the housing 21. Each of the discharge fins 97 is projectingly provided at a given angle (e.g., in FIG. 6, about 45 degrees) with a corresponding one of the deflection fins 96, whereby the airstream passing through each of the four airstream passages is deflected toward the adjacent outer wall 21a of the housing 21. The discharge fins 97 are formed such that they have approximately the same height, and one of them located closer to the cooling fan 70 has a shorter length.

The cooling fan 70 is provided as a means to generate an airstream directed toward the heat sink 90 so as to cool the driving motor 42 (particularly, the motor shaft 44) and the integrated circuit 46. In this embodiment, with a view to reliably directing the airstream, a duct 80 made of a resin material is disposed between the cooling fan 70 and the heat sink 90.

Figure 7:
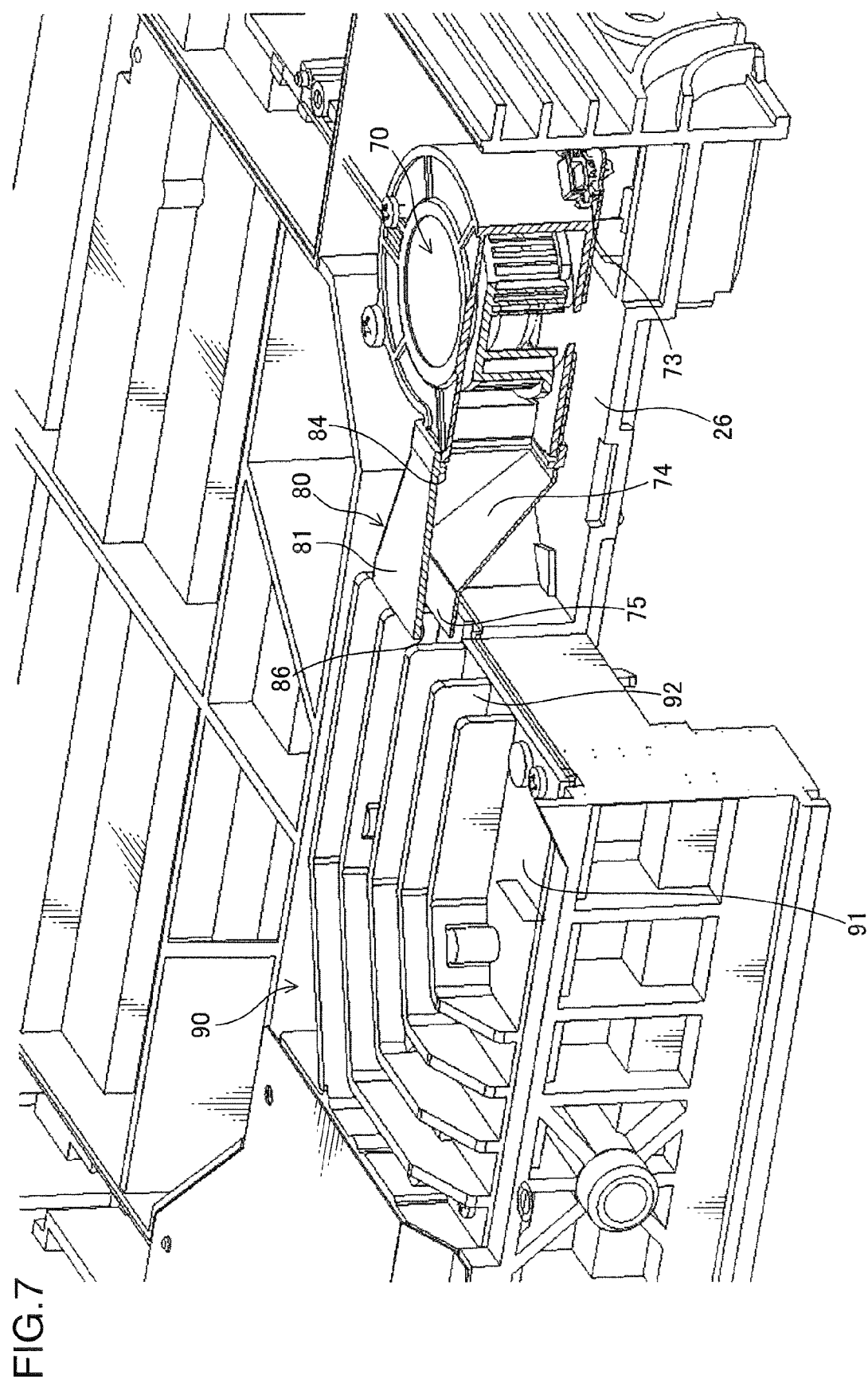
FIG. 7 is a sectional view taken along the line VII-VII in FIG. 6.

Specifically, this duct 80 is formed in a generally angular-C shape in section. The duct 80 comprises a horizontal lower wall 81 extending along the mount plate 26, and two fanned-out side walls 82 disposed on respective opposite sides of the lower wall 81 to extend in an upward direction of the housing 21 (i.e., in FIG. 6, downwardly). As shown in FIG. 7, the duct 80 has a fan-side opening 84 (serving as a second opening) located in opposed relation to the cooling fan 70, and a mirror-side opening 86 (serving as a first opening) located in opposed relation to the heat sink 90.

The lower wall 81 and the side walls 82 are formed and arranged to gradually widen and fan out in a direction from the cooling fan 70 to the heat sink 90, in top plan view. Specifically, as shown in FIGS. 6 and 7, the fan-side opening 84 is formed in a shape fittable to an air outlet port of the cooling fan 70. In the mirror-side opening 86, the horizontal lower wall 81 is arranged to have a height approximately equal to the height of the fins 92 of the heat sink 90, and the fanned-out side walls 82 are arranged to fan out in a widthwise direction of the heat sink 90 in such a manner as to be located in adjacent (or contact) and opposed relation to respective outermost two of the five fins 92.

On the other hand, the narrowing wall portion 74 of the fastening plate 72 is formed to have a widthwise size which gradually increases in the direction from the cooling fan 70 to the heat sink 90. More specifically, the narrowing wall portion 74 and the superimposing wall portion 75 serve as a upper wall of the duct 80, wherein the narrowing wall portion 74 is arranged to extend obliquely downwardly from the air outlet port of the cooling fan 74 toward the lower surface of the heat-sink body 91 having the fins 92, so as to narrow the mirror-side opening 86 along a heightwise direction of the heat sink 90.

Thus, as compared with the fan-side opening 84, the mirror-side opening 86 is formed to become longer in the widthwise direction and become shorter in the height direction. In this case, the two openings 84, 86 are formed to have approximately the same opening area. This makes it possible to direct the airstream from the cooling fan 70, toward an entire width of the heat sink 90, i.e., an entire region between the two outermost fins 92.

Figure 8:
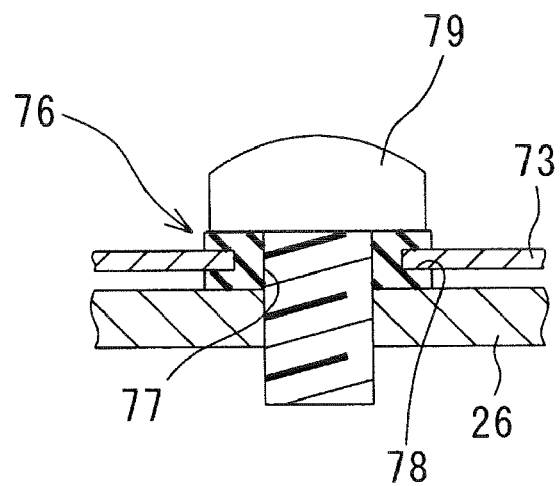
FIG. 8 is a sectional view taken along the line VIII-VIII in FIG. 6.

In the above structure, the cooling fan 70 (or the fastening plate 72) and the housing 21 are fastened together through an anti-vibration rubber 76 (serving as a first elastic member). Specifically, as shown in FIG. 8, the anti-vibration rubber 76 is formed in a cylindrical shape having a center hole 77, and a concave groove 78 formed in an outer peripheral surface thereof at an approximately intermediate position of an axis of the center hole 77 to vertically clamp the horizontal wall portion 73. In assembling of the anti-vibration rubber 76, the concave groove 78 is loosely fitted onto an inner peripheral edge of a mounting hole formed in the horizontal wall portion 73, and then an end surface of the anti-vibration rubber 76 is brought into contact with the mount plate 26. Then, a screw 79 is inserted into the center hole 77 from above (in FIG. 8) the anti-vibration rubber 76, and threadingly engaged with the mount plate 26. In this manner, the fastening plate 72 is connected to the mount plate 26 to allow the cooling fan 70 to be fixed to the housing 21.

Figure 9:
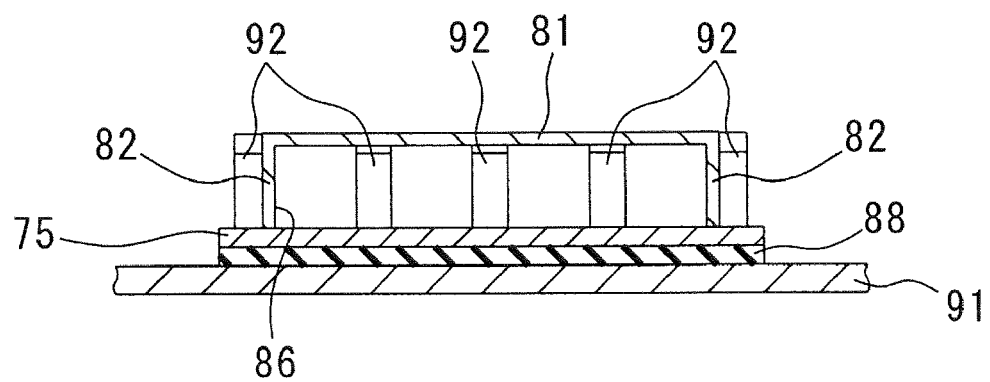
FIG. 9 is a sectional view taken along the line IX-IX in FIG. 6.

As shown in FIG. 9, the fastening plate 72 and heat sink 90 are connected to each other through an anti-vibration sponge 88 (serving as a second elastic member). The anti-vibration sponge 88 is formed in a generally-rectangular plate shape, and bonded to one surface of the superimposing wall portion 75 by a double-face adhesive tape or the like. Thus, the superimposing wall portion 75 is mounted to the heat-sink body 91 through the anti-vibration sponge 88.

An operation of the printer 1 will be described below. Upon starting an image forming operation, each of the sheets P is separated from the stack, and sent out from the cassette 3, or a recording member is sent out from the manual sheet feed section 5, and the sheet P or the recording member reaches the registration roller 101. The registration roller 101 is operable to send the sheet P or the recording member to the secondary transfer section 9 while correcting an oblique feeding of the sheet P or the recording member and adjusting a timing relative to formation of a toner image in the image forming module 30.

Under control of the controller (not shown), a laser beam L based on image data is emitted from the exposure unit 20. Thus, according to the laser beam L, electrostatic latent images of a document image are formed on the respective photosensitive drums 31Y, 31M, 31C, 31B in the image forming module 30. Then, toner images are formed on the respective photosensitive drums based on the electrostatic latent images, and primarily transferred onto and combined together on the intermediate transfer belt 7. Then, the combined toner image on the intermediate transfer belt 7 is secondarily transferred onto the sheet P or the recording member at the secondary transfer section 9.

Subsequently, the sheet P or the recording member is transported toward the fixing section 11 while supporting the unfixed toner image thereon, and the unfixed toner image is fixed by a heating roller in the fixing section 11. Then, the sheet P or the recording member discharged from the fixing section is transported upwardly, and ejected into the catch tray 13.

Differently from the above one-side printing operation, in a double-side printing operation, a transport direction of the sheet P or the recording member discharged from the fixing section is switched by the switchback section 14. Specifically, the sheet P or the recording member after being subjected to the one-side printing operation is transported through the double-side printing unit 102. Then, the sheet P or the recording member is re-transported toward the secondary transfer section 9 via the registration roller 101. Then, in the double-side printing operation, a toner image is transferred onto an unprinted surface of the sheet P or the recording member.

As described above, in the printer 1 according to this embodiment, heat generated in the motor shaft 44 of the driving motor 42 along with rotation of the motor shaft 44 during the operation of rotating the polygon mirror 41 is absorbed by the metal heat sink 90. In order to release (i.e., dissipate) heat absorbed in the heat sink 90 in an air-cooling manner, the heat sink 90 is provided with the fins 92 adapted to direct an airstream from the cooling fan 70, toward a position corresponding to a specific position of the motor shaft 44 (i.e., a mounting position of the driving motor 42). That is, the heat sink 90 has a ducting function in addition to the heat-absorbing function, and therefore the airstream generated by the cooling fan 70 is positively supplied toward the motor shaft 44. Thus, the heat sink 90 can be efficiently cooled to perform more adequate cooling of the motor shaft 44 than ever before. This contributes to enhancement in reliability of the exposure unit 20.

Further, the fins 92 of the heat sink 90 include the guide fins 95 adapted to guide the airstream from the cooling fan 70, toward the driving motor 42 (the motor shaft 44), the deflection fins 96 adapted to deflect the airstream from the guide fins 95, and the discharge fins 97 adapted to discharge the airstream from the deflection fins 96 outside the housing 21. Thus, in addition to the advantage of being able to efficiently cool the heat sink 90, the airstream after contributing to heat exchange can be quickly discharged outside the housing 21.

The airstream generated by the cooling fan 70 is positively supplied toward the mounting position of the driving motor 42 (the motor shaft 44) while being guided by the guide fins 95, and a direction of the airstream is changed at a position below the mounting position of the driving motor 42 by the deflection fins 96. Thus, a larger amount of airstream is brought into contact with the deflection fins at the position below the driving motor 42, so as to allow the cooling of the motor shaft 44 to be more adequately performed.

In the above arrangement, one of the deflection fins 96 may be disposed on an axis of the motor shaft 44. This provides an optimal heat sink configuration for the airstream from the cooling fan 70, to allow the motor shaft 44 to be cooled with the utmost efficiency.

The heat sink 90 is arranged to absorb heat generated in a circuit board, such as the integrated circuit 46 adapted to drive the driving motor 42. The fins 92 can also positively release the heat absorbed in the heat sink 90 to further contribute to the enhancement in reliability of the exposure unit 20.

In most cases, the exposure unit 20 employed by an image forming apparatus is designed in a relatively flat shape, and thereby a dimensional allowance in a heightwise direction thereof is limited to a small value. In this embodiment, a sirocco fan is employed as the cooling fan 70, and disposed to send air from a lateral side of the heat sink 90. This makes it possible to reduce a heightwise dimension of the exposure unit 20.

Further, the duct 80 is provided between the cooling fan 70 and the heat sink 90. This duct 80 is formed and arranged to direct the airstream from the cooling fan 70, toward the heat sink 90. Specifically, the airstream generated by the cooling fan 70 is positively supplied toward the heat sink 90. Thus, the heat sink 90 can be optimally cooled to perform more adequate cooling of the motor shaft 44 than ever before.

The mirror-side opening 86 of the duct 80 has a shape which is broadened along the widthwise direction of the heat sink 90 and narrowed along the heightwise direction of the heat sink 90, with respect to a shape of the fan-side opening 84 of the duct 80. Thus, the airstream from the cooling fan 70 is supplied to the heat sink 90 under constraint of the shape of the mirror-side opening 86. This makes it possible to optimally cool the heat sink 90.

Further, the mirror-side opening 86 and the fan-side opening 84 are formed to have approximately the same opening area. This makes it possible to sent air over the entire width of the heat sink 90 substantially without reduction in amount of airstream directing toward the heat sink 90. In addition, the mirror-side opening 86 is formed to have a height approximately equal to the height of the fins 92. This makes it possible to supply the airstream from the cooling fan 70, toward the heat sink 90 with the upmost efficiency.

The cooling fan 70 is attached to the housing 21 having the polygon mirror 41, instead of the apparatus main body 2. That is, the cooling fan 70 can be mounted to the apparatus main body 2, in a state after the cooling fan 70 is pre-attached to the exposure unit 20. This makes it possible to facilitate an attaching operation for the cooling fan 70, as compared with cases where the cooling fan 70 is directly attached to the apparatus main body 2.

The cooling fan 70 is fixed to the fastening plate 72, and the fastening plate 72 is fastened to the housing 21 through the anti-vibration rubber 76. This makes it possible to prevent vibration of the cooling fan 70 from adversely affecting optical characteristics of the exposure unit 20 so as to contribute to enhancement in reliability of the exposure unit 20.

The narrowing wall portion 74 of the fastening plate 72 plays a roll in defining an airstream passage, as a part of a wall of the duct 21. This makes it possible to facilitate an operation of attaching the duct 80 to the housing 21, while facilitating reduction in height of the housing 21, as compared with cases where a duct with a closed-section structure is attached to the housing 21.

The superimposing wall portion 75 of the fastening plate 72 is superimposed on the heat sink 90 through the anti-vibration sponge 88, so as to prevent vibration of the cooling fan 70 from adversely affecting the optical characteristics of the exposure unit 20. This also contributes to enhancement in reliability of the exposure unit 20.

In the printer 1 having the above features, heat arising from the rotation of the motor shaft 44 can be adequately released in an air-cooling manner to obtain desired image quality without characteristic changes on the surfaces of the photosensitive drums 31. This contributes to enhancement in reliability of the printer 1.

The present invention is not limited to the above embodiment, but various changes and modifications may be made therein without departing from spirit and scope of the present invention as set forth in appended claims.

For example, while the printer according to the above embodiment has the intermediate transfer belt 7, the present invention may be applied to any other suitable printer devoid of the intermediate transfer belt 7, as long as it has a fin 92 adapted to direct an airstream from a cooling fan 70, toward a driving motor 42 (motor shaft 44). Further, the plate-shaped member (heat sink) may be made of a resin material having a high heat conductivity (e.g., heat-conductive resin) as well as metal. Further, while the above embodiment has been shown as an example where the present invention is realized in the printer as an image forming apparatus, it is understood that the present invention may be applied to any other suitable type of image forming apparatus, such as a copy machine or a facsimile machine.

The above specific embodiment includes an invention having the following features.

A scanning optical module according to one aspect of the present invention comprises: a light source; a rotatable multifaceted mirror adapted to scanningly deflect a scanning beam emitted from the light source, in a given direction; a driving device adapted to drivingly rotate the rotatable multifaceted mirror through a shaft thereof; a plate-shaped member formed with a driving device-mounting portion mounting thereto the driving device in such a manner as to absorb heat generated in the shaft; an air blower adapted to generate an airstream; and an airstream passage-defining member adapted to direct the airstream from the air blower, toward the driving device-mounting portion of the plate-shaped member.

In the above scanning optical module, the rotatable multifaceted mirror is driven according to rotation of the shaft of the driving device. Heat arising from the rotation of the shaft is absorbed by the plate-shaped member. In order to release (i.e., dissipate) the absorbed heat using the air blower, the airstream passage-defining member is provided as a means to direct the airstream from the air blower, toward the driving device-mounting portion. Thus, the airstream generated by the air blower can be positively directed toward the driving device-mounting portion to achieve adequate cooling of the shaft. This contributes to enhancement in reliability of the scanning optical module.

Preferably, in the scanning optical module of the present invention, the airstream passage-defining member includes an airstream passage defined by a fin member projectingly provided on the plate-shaped member. According to this feature, a ducting function can be additionally provided to the plate-shaped member to allow the plate-shaped member to be efficiently cooled.

Preferably, in the above scanning optical module, the airstream passage-defining member includes a guide portion adapted to guide the airstream from the air blower, toward the driving device-mounting portion, and a catch portion adapted to deflect the airstream from the guide portion. According to this feature, a ducting structure suitable for cooling the driving device-mounting portion can be established.

Preferably, in the above scanning optical module, the catch portion is disposed at a position corresponding to the driving device-mounting portion. According to this feature, a direction of the airstream generated by the air blower is changed at the position corresponding to the driving device-mounting portion. Thus, a larger amount of airstream is brought into contact with the catch portion at the position corresponding to the driving device-mounting portion, so as to allow the shaft to be more adequately cooled.

Preferably, the scanning optical module of the present invention further comprises a circuit board disposed adjacent to the rotatable multifaceted mirror and adapted to drive the driving device, wherein the plate-shaped member is in contact with the circuit board. According to this feature, the airstream passage-defining member allows heat generated in the circuit board to be additionally released in a positive manner.

Preferably, in the scanning optical module of the present invention, the air blower consists of a sirocco fan adapted to send air in a fan rotation direction. According to this feature, a heightwise dimension of the scanning optical module can be reduced.

Preferably, the scanning optical module of the present invention comprises a duct disposed between the air blower and the plate-shaped member, and adapted to direct the airstream from the air blower, toward the plate-shaped member. According to this feature, the duct allows the airstream generated by the air blower to be positively supplied toward the plate-shaped member. Thus, the plate-shaped member can be optimally cooled to perform more adequate cooling of the shaft. This contributes to enhancement in reliability of the scanning optical module.

Preferably, in this scanning optical module, the duct has a first opening located in opposed relation to the plate-shaped member, and a second opening located in opposed relation to the air blower, wherein the first opening has a shape which is broadened along a widthwise direction of the plate-shaped member and narrowed along a heightwise direction of the plate-shaped member, with respect to a shape of the second opening. According to this feature, the airstream from the air blower is directed toward the plate-shaped member with enhanced directionality. This makes it possible to perform optimal cooling of the plate-shaped member.

Preferably, in the above scanning optical module, the airstream passage-defining member includes an airstream defined by a fin member projectingly provided on the plate-shaped member, and the first opening has a height approximately equal to a height of the fin member. According to this feature, the airstream from the air blower can be more efficiently directed toward the plate-shaped member.

Preferably, the scanning optical module of the present invention further comprises a housing to which the rotatable multifaceted mirror is assembled, wherein the air blower is attached to the housing. According to this feature, the air blower can be mounted to an apparatus body of an image forming apparatus, in a state after the air blower is pre-attached to the scanning optical module. This makes it possible to facilitate an attaching operation for the air blower, as compared with cases where the air blower is directly attached to the apparatus body.

Preferably, the above scanning optical module further comprises a support member which supports the air blower in such a manner as to allow the air blower to be fixed to the housing; and a first elastic member disposed between the support member and the housing. According to this feature, optical characteristics of the scanning optical module can be prevented from being adversely affected by vibration of the air blower.

Preferably, the above scanning optical module further comprises a duct disposed between the air blower and the plate-shaped member, and adapted to direct the airstream from the air blower, toward the plate-shaped member, wherein the support member serves as at least a part of a wall of the duct. According to this feature, the support member serves as a part of the wall of the duct. This makes it possible to facilitate reduction in height of the housing.

Preferably, the above scanning optical module further comprises a second elastic member disposed in a superimposed region between the plate-shaped member and a portion of the support member serving as the wall of the duct. According to this feature, the optical characteristics of the scanning optical module can be prevented from being adversely affected by the vibration of the air blower.

A scanning optical module according to another aspect of the present invention comprises: a light source; a rotatable multifaceted mirror adapted to scanningly deflect a scanning beam emitted from the light source, in a given direction; a motor adapted to drivingly rotate the rotatable multifaceted mirror through a motor shaft thereof; a heat sink which has a motor-mounting portion mounting thereto the motor on the side of a first surface thereof, and has a plurality of fins projectingly provided on the side of a second surface thereof on an opposite side of the first surface; and an air blower adapted to generate an airstream, wherein a part or all of the fins define an airstream passage adapted to guide the airstream generated by the air blower, in a given direction, and wherein the airstream passage is configured to pass through the side of the second surface at a position corresponding to the motor-mounting portion or a vicinity thereof on the side of the first surface.

In this scanning optical module, the fins provided on the heat sink can guide the airstream generated from the air blower, in such a manner that the airstream passes through the motor-mounting portion or the vicinity thereof in the heat sink. This makes it possible to efficiently cool the motor (particularly, the motor shaft).

Preferably, in the scanning optical module set forth in the second aspect of the present invention, the motor-mounting portion of the heat sink is formed as a depression on the side of the first surface and as a protrusion on the side of the second surface, wherein the motor is received in the depression of the motor-mounting portion, and the airstream passage is configured to pass through the protrusion of the motor-mounting portion. According to this feature, the airstream can be positively hit against the protrusion to achieve enhanced cooling efficiency.

Preferably, in this scanning optical module, the fins include a first fin portion adapted to linearly guide the airstream generated by the air blower, to a position on a slightly upstream side relative to the motor-mounting portion, and a second fin portion connected to a downstream end of the first fin portion and adapted to deflect the airstream from the first fin portion, and the motor-mounting portion is in contact with the second fin portion. According to this feature, an amount of airstream to be hit against the protrusion can be increased in the second fin portion where the airstream is deflected, so as to further efficiently cool the motor-mounting portion.

Preferably, the above scanning optical module further comprises a duct disposed between the air blower and the heat sink and adapted to direct the airstream from the air blower, toward the heat sink, wherein: the first fin portion has an upstream end extending to an edge of the heat sink located in opposed relation to the air blower; and the duct has a first opening located in opposed relation to the heat sink, and a second opening located in opposed relation to the air blower, wherein the first opening is in contact with or in adjacent relation to the upstream end of the first fin portion. According to this feature, the airstream from the air blower can be effectively guided to the airstream passage of the heat sink.

An image forming apparatus according to yet another aspect of the present invention comprises: an image bearing member adapted to allow an electrostatic latent image to be formed on a surface thereof; and a scanning optical module adapted to emit a scanning beam onto the surface of the image bearing member so as to form an electrostatic latent image thereon. The scanning optical module includes: a light source; a rotatable multifaceted mirror adapted to scanningly deflect the scanning beam emitted from the light source, in a given direction; a driving device adapted to drivingly rotate the rotatable multifaceted mirror through a shaft thereof; a plate-shaped member formed with a driving device-mounting portion mounting thereto the driving device in such a manner as to absorb heat generated in the shaft; an air blower adapted to generate an airstream; and an airstream passage-defining member adapted to direct the airstream from the air blower, toward the driving device-mounting portion of the plate-shaped member.

In the image forming apparatus of the present invention, heat arising from rotation of the shaft is adequately released in an air-cooling manner to obtain adequate image quality without characteristic changes on the surface of the image support member. Thus, the scanning optical module also contributes to enhancement in reliability of the image forming apparatus.

This application is based on Japanese patent application serial Nos. 2007-113900 and 2007-113901, filed in Japan Patent Office on Apr. 24, 2007, the contents of which are hereby incorporated by reference.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A scanning optical module comprising:
   a light source;
   a rotatable multifaceted mirror configured to scanningly deflect a scanning beam emitted from said light source, in a given direction;
   a driving device configured to drivingly rotate said rotatable multifaceted mirror through a shaft thereof;

a plate-shaped member formed with a driving device-mounting portion mounting thereto said driving device in such a manner as to absorb heat generated in said shaft;

an air blower configured to generate an airstream; and an airstream passage-defining member adapted to direct the airstream from said air blower, toward said driving device-mounting portion of said driving device on said plate-shaped member, wherein said airstream passage-defining member includes an airstream passage defined by a fin projectingly provided on said plate-shaped member, and said fin includes a guide portion configured to guide the airstream from said air blower, toward said driving device-mounting portion, and a catch portion formed in a downstream end of said guide portion, and configured to deflect the airstream from said guide portion.

2. The scanning optical module as defined in claim 1, wherein said catch portion is disposed at a position corresponding to said driving device-mounting portion.

3. The scanning optical module as defined in claim 1, which further comprises a circuit board disposed adjacent to said rotatable multifaceted mirror and configured to drive said driving device, wherein said plate-shaped member is in contact with said circuit board.

4. The scanning optical module as defined in claim 1, wherein said air blower consists of a sirocco fan adapted to send air in a fan rotation direction.

5. The scanning optical module as defined in claim 1, which further comprises a duct disposed between said air blower and said plate-shaped member, and adapted to direct the airstream from said air blower, toward said plate-shaped member.

6. The scanning optical module as defined in claim 5, wherein said duct has a first opening located in opposed relation to an edge of said fin of said guide portion, and a second opening located in opposed relation to said air blower, said first opening has a shape which is broadened along a widthwise direction of said plate-shaped member and narrowed along a heightwise direction of said plate-shaped member, with respect to a shape of said second opening, and said first opening has a height approximately equal to a height of said fin.

7. The scanning optical module as defined in claim 1, which further comprises a housing to which said rotatable multifaceted mirror is assembled, wherein said air blower is attached to said housing.

8. The scanning optical module as defined in claim 7, which further comprises:

a support member which supports said air blower in such a manner as to allow said air blower to be fixed to said housing; and a first elastic member disposed between said support member and said housing.

9. The scanning optical module as defined in claim 8, which further comprises a duct disposed between said air blower and said plate-shaped member, and adapted to direct the airstream from said air blower, toward said plate-shaped member, wherein said support member serves as at least a part of a wall of said duct.

10. The scanning optical module as defined in claim 9, which further comprises a second elastic member disposed in a superimposed region between said plate-shaped member and a portion of said support member serving as said wall of said duct.

11. A scanning optical module comprising:

a light source;

a rotatable multifaceted mirror configured to scanningly deflect a scanning beam emitted from said light source, in a given direction;

a motor configured to drivingly rotate said rotatable multifaceted mirror through a motor shaft thereof;

a heat sink which has a motor-mounting portion mounting thereto said motor on the side of a first surface thereof, and a plurality of fins projectingly provided on the side of a second surface thereof on an opposite side of said first surface; and an air blower configured to generate an airstream, wherein a part or all of said fins define an airstream passage configured to guide the airstream generated by said air blower, said airstream passage is configured to pass through the side of said second surface at a position corresponding to said motor-mounting portion or a vicinity thereof on the side of said first surface, said fins include a first fin portion configured to linearly guide the airstream generated by said air blower, to a position on a slightly upstream side relative to said motor-mounting portion, and a second fin portion connected to a downstream end of said first fin portion and configured to deflect the airstream from said first fin portion, and said motor-mounting portion is in contact with said second fin portion.

12. The scanning optical module as defined in claim 11, wherein said motor-mounting portion of said heat sink is formed as a depression on the side of said first surface and as a protrusion on the side of said second surface, wherein:

said motor is received in said depression of said motor-mounting portion; and said second fin portion is configured to pass through said protrusion of said motor-mounting portion.

13. The scanning optical module as defined in claim 12, which further comprises a duct disposed between said air blower and said heat sink and configured to direct the airstream from said air blower, toward said heat sink, wherein:

said first fin portion has an upstream end extending to an edge of said heat sink located in opposed relation to said air blower; and said duct has a first opening located in opposed relation to said heat sink, and a second opening located in opposed relation to said air blower, said first opening being in contact with or in adjacent relation to said upstream end of said first fin portion, said first opening has a height approximately equal to a height of said fin of said first fin portion.

14. An image forming apparatus comprising:

an image bearing member configured to allow an electrostatic latent image to be formed on a surface thereof; and a scanning optical module configured to emit a scanning beam onto said surface of said image bearing member so as to form an electrostatic latent image thereon, said scanning optical module including:

a light source;

a rotatable multifaceted mirror configured to scanningly deflect the scanning beam emitted from said light source, in a given direction;

a driving device configured to drivingly rotate said rotatable multifaceted mirror through a shaft thereof;

a plate-shaped member formed with a driving device-mounting portion mounting thereto said driving device in such a manner as to absorb heat generated in said shaft;

an air blower configured to generate an airstream; and an airstream passage-defining member configured to direct the airstream from said air blower, toward said driving device-mounting portion of said driving device on said plate-shaped member, wherein said airstream passage-defining member includes an airstream passage defined by a fin projectingly provided on said plate-shaped member, and said fin includes a guide portion configured to guide the airstream from said air blower, toward said driving device-mounting portion, and a catch portion formed in a downstream end of said guide portion, and configured to deflect the airstream from said guide portion.

15. A scanning optical module comprising:

a light source;

a rotatable multifaceted mirror configured to scanningly deflect a scanning beam emitted from said light source, in a given direction;

a driving device configured to drivingly rotate said rotatable multifaceted mirror through a shaft thereof;

a plate-shaped member formed with a driving device-mounting portion mounting thereto said driving device in such a manner as to absorb heat generated in said shaft;

an air blower configured to generate an airstream; pg,30 an airstream passage-defining member configured to direct the airstream from said air blower, toward a driving device-mounting portion of said driving device on said plate-shaped member;

a housing being attached to said air blower, and assembled to said rotatable multifaceted mirror;

a support member which supports said air blower in such a manner as to allow said air blower to be fixed to said housing;

a first elastic member disposed between said support member and said housing;

a duct disposed between said air blower and said plate-shaped member, and configured to direct the airstream from said air blower, toward said plate-shaped member; and a second elastic member disposed in a superimposed region between said plate-shaped member and a portion of said support member serving as said wall of said duct.

\* \* \* \* \*